Nov. 25, 1958    C. R. HENRICI ET AL    2,862,204
COUNTER MEASURE SYSTEM
Filed April 27, 1956    3 Sheets-Sheet 1
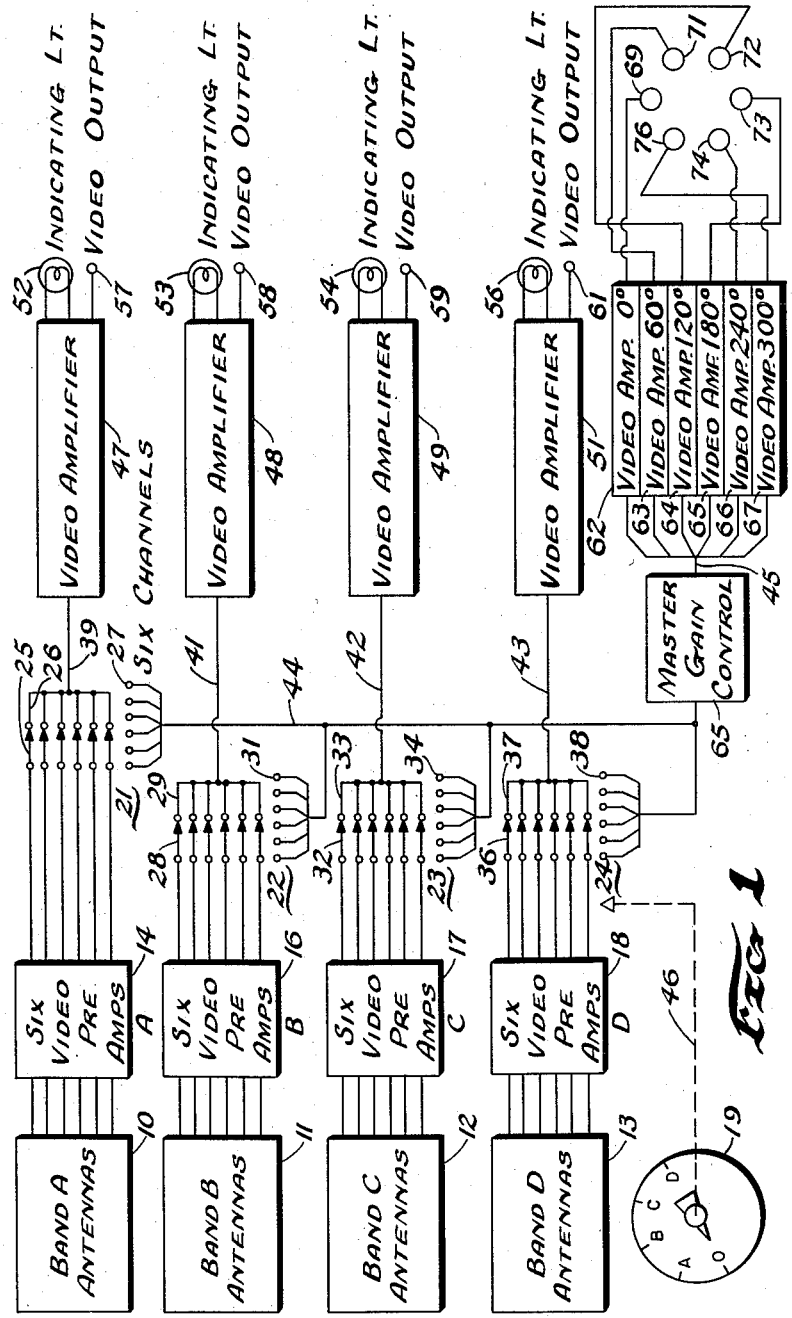
INVENTORS
CARL R. HENRICI
JOHN P. SHANKLIN
BY
ATTORNEY Nov. 25, 1958
C. R. HENRICI ET AL
2,862,204
COUNTER MEASURE SYSTEM
Filed April 27, 1956
3 Sheets-Sheet 2
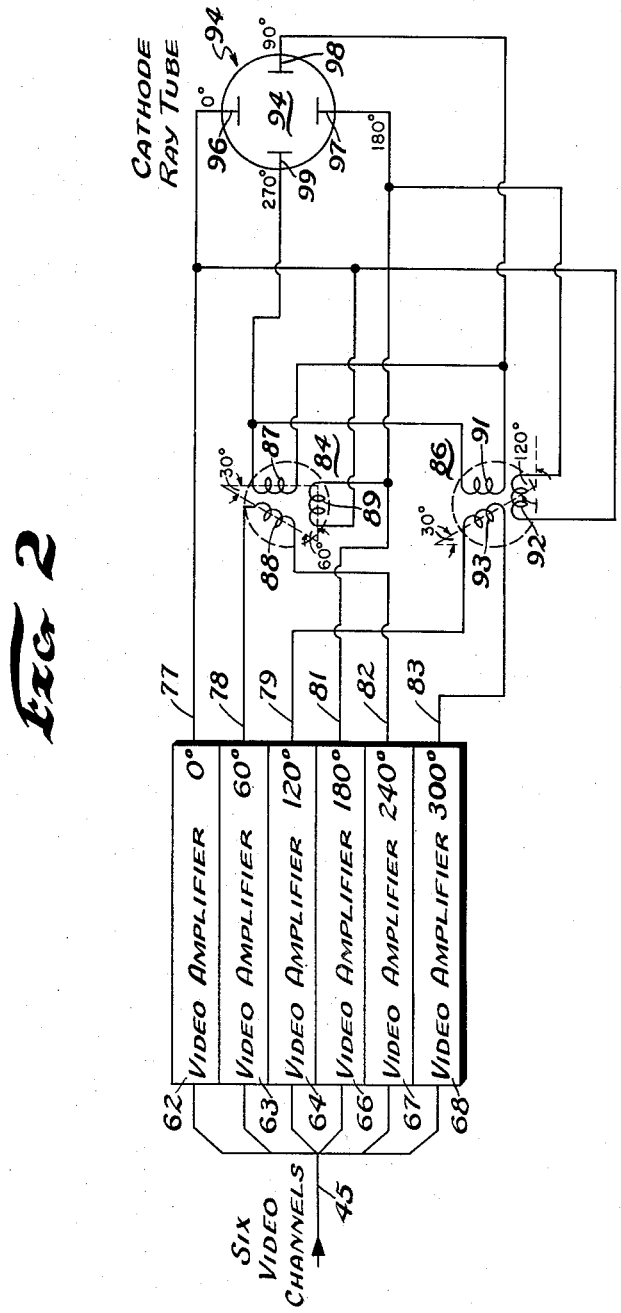
INVENTORS
CARL R. HENRICI
JOHN P. SHANKLIN
BY
ATTORNEY

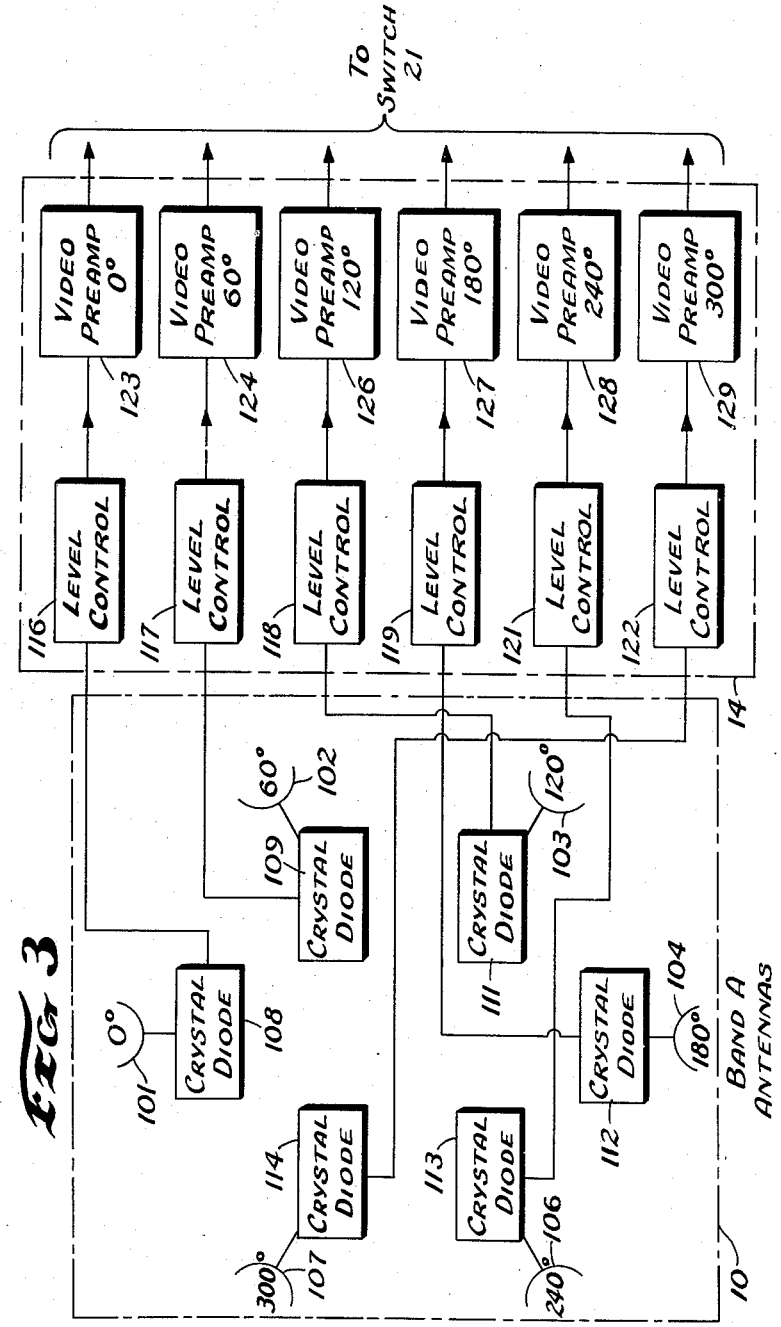

United States Patent Office 2,862,204
Patented Nov. 25, 1958

2,862,204

COUNTER MEASURE SYSTEM

Carl R. Henrici and John P. Shanklin, Cedar Rapids, Iowa, assignors to Collins Radio Company, Cedar Rapids, Iowa, a corporation of Iowa Application April 27, 1956, Serial No. 581,233

7 Claims. (Cl. 343—100)

This invention relates in general to radio receiving systems and in particular to a receiving system capable of monitoring a large frequency spectrum simultaneously and incorporating both omnidirectional and directional indicating means.

Present day countermeasure receiving systems generally incorporate both directional and omnidirectional reception to provide means for the location and identification of received signals. When such systems are employed to cover a wide frequency spectrum, a plurality of antennas is generally needed to efficiently cover the entire spectrum. Thus a first antenna may be employed to receive signals in the lower portion of the desired spectrum, a second antenna may be employed to receive the next higher portion of the spectrum and so on. These types of countermeasure systems have the inherent disadvantage that only one portion of the spectrum may be monitored at any one time. Further, such systems generally employ heterodyning techniques wherein the portion of the spectrum being analyzed necessitates a tuning over the band, which tuning necessarily involves a discrete time element.

There exists from a tactical standpoint, the need for a receiving means operable over a wide frequency spectrum wherein monitoring of the entire spectrum can be achieved instantaneously to give an indication of the presence of a signal on any band in addition to the one which normally can be detected by conventional countermeasure receiving installations. For example, the need for knowing quickly the presence of a strong signal anywhere in the entire spectrum is of especial importance to a submarine commander when the submarine surfaces after a dive. The system described herein will provide, in such situations, knowledge of the presence of a signal anywhere within a wide frequency spectrum and, in addition, will provide an indication of the direction from which the signal is being propagated.

It is an object of this invention, therefore, to provide a countermeasure receiving system capable of presenting instantaneously the presence of a signal being received by any one of a plurality of antennas such as may be necessary to cover a desired frequency spectrum.

It is a further object of this invention to provide, from a plurality of fixed antenna arrays, an indication not only of the reception of a signal by any one of the antenna arrays but also indication of the direction of the received signal or signals relative to the receiving equipment.

It is a feature of this invention to incorporate with a plurality of antenna arrays "wide-open" reception by means of a crystal video receiver.

These and other features and objects of this invention will become apparent from the following description when read in conjunction with the drawings, in which;

Figure 1 is a functional diagram of the receiving system,

Figure 2 is a functional diagram of a cathode ray presentation system to be considered in conjunction with the circuitry of Figure 1, and Figure 3 is a functional diagram of one of a plurality of antenna arrays including its demodulating circuitry which is used in the system of this invention.

With reference to Figure 1, the system proposed might be considered to consist of two main functional parts; the antenna system and the video receiving and presentation system. In the embodiment shown in Figure 1, the desired frequency spectrum to be monitored is received by four antenna arrays 10, 11, 12, and 13. Each of the antenna arrays is designated by a band indication which corresponds to similar positions on a selector switch 19. Thus antenna array 10 is indicated as covering band A which might, for example, be the lowest segment of the desired frequency spectrum. Similarly, antennas 11, 12, and 13 are indicated to be those receiving the portions of the frequency spectrum designated as B, C, and D, respectively. It is to be understood, of course, that in the system proposed the desired spectrum to be monitored is of such a width as to necessitate the plurality of antenna arrays shown in order to receive signals throughout the entire spectrum.

Each of the antenna arrays is a fixed installation and is composed of six individual antennas. Each individual antenna is so oriented that it receives from a 60° segment of the complete azimuth circle. This is indicated in Figure 3 wherein the band A antenna array, generally designated by the reference numeral 10, is indicated in more detail. The band A antenna array is shown to be composed of a first antenna 101 oriented with respect to the antenna installation so as to have a 60° beam width centered about the 0° azimuth. In addition, a second antenna 102 is oriented such that its 60° beam width is centered about the 60° azimuth. Similarly, antennas 103, 104, 106, and 107 are oriented to be centered about the 120°, 180°, 240°, and 300° azimuths, respectively. The signals received from each individual antenna in each antenna array of this system are demodulated separately by crystal diodes. With reference to Figure 3, the 0° antenna 101 is demodulated by crystal diode 108, the signals received by the 60° antenna 104 are demodulated by crystal diode 109 and similarly the signals received on the remaining antennas 103, 104, 106, and 107 are demodulated by crystal diodes 111, 112, 113, and 114, respectively. The crystal diodes are located in immediate proximity of the antenna to improve sensitivity and match bandwidth. With reference to Figure 1, the makeup of antenna arrays 11, 12, and 13, covering bands B, C, and D, respectively, is similar to that discussed with respect to antenna array 10. The individual video signals from the six antennas of each array are applied to video preampliers indicated in Figure 1 as preamplifiers 14, 16, 17, and 18. The individual outputs from the six preamplifiers associated with each antenna are then connected to a switching means indicated in Figure 1 by sections 21, 22, 23, and 24 of switch 19. Thus the outputs from individual preamplifiers 14 are applied to movable contact arms 25 of switch section 21. Similarly, the individual outputs of video preamplifiers 16 are connected to movable contact arms 28 of switch section 22; outputs from video preamplifiers 17 are applied to movable contact arms 32 of switch section 23; and outputs from video preamplifiers 18 are applied to movable contact arms 36 of switch section 24.

The above-mentioned switch contact arms for each switch section are individually gang-controlled by the positioning of switch 19 through a mechanical linkage designated as 46. The functioning of this gang switch is such that on a first position the six individual video channels associated with each antenna band are connected in parallel and applied to an associated video amplifier. Thus, on position "0" of switch 19, the individual video channels from contacts 25 of switch section 21 are connected to paralleled contacts 26. The combined outputs are connected through connector 39 to video amplifier 47. In a similar manner, the video outputs from the other antenna bands are connected to their individual video amplifiers. The combined output of video preamplifiers 16 associated with antenna 11 are connected through switch contacts 28 and 29 of switch section 22 and connector 41 to video preamplifier 48. The outputs from video preamplifiers 17 are connected through switch contacts 32, and 33 of switch section 23 through connector 42 to video preamplifier 49. The outputs of video preamplifiers 18 are connected through contacts 36 and 37 of switch section 24 through connector 43 to video preamplifier 51. When the tuning selector switch 19 on position "0," as indicated in Figure 1, the video from all six sections of a single antenna array is applied in common to a video amplifier. The outputs from the video amplifiers 47, 48, 49, and 51 are applied to indicating lights such that the presence of a signal within a particular band is indicated by the lighting of the corresponding lamp. Thus the reception of a signal by the band A antennas is indicated by the lighting of lamp 52. Similarly, the reception of signals in bands B, C, and D is indicated by the lighting of lamps 53, 54, and 56, respectively. In addition to the individual band indicating lamps, each video amplifier may be provided with an output jack, 57, 58, 59, or 61, from which video from the particular band may be readily available for purposes of video analysis functions desired in countermeasure systems.

The system also provides means for an indication of the direction from which the received signals are emanating. Thus, should the presence of a signal on the band A antennas be indicated by the lighting of lamp 52 (with function selector switch 19 in position "0"), the direction of the signal source may be found by positioning switch 19 to position A. Position A of the switch, through appropriate mechanical linkage, switches section 21 of the switch (and section 21 only) such that contacts 25 are connected to contacts 27. This switching connects each of the six individual video channels from the antennas of the band A array through individual channels (indicated as channels 44) to individual video amplifiers 62, 63, 64, 66, 67, and 68, wherein the signal received from each of the six azimuth sectors is individually amplified and the output supplied to a formation of indicating lamps indicative of the orientation of the directional antennas. Thus the reception of a signal whose source is directly ahead of the antenna installation will be indicated by the lighting of lamp 69. Similarly, reception of signals from the 60°, 120°, 180°, 240°, and 300° azimuth sectors will be indicated by the lighting of lamps 71, 72, 73, 74, and 76, respectively. Since it is possible that the strength and radation pattern of a received signal may light more than one azimuth indicating lamp, each of the individual video channels is connected to the azimuth video amplifiers through a master gain control 65. Adjustment of the gain control to extinguish all but one or two lights provides a coarse directional indication.

The functioning of switch 19 for positions B, C, and D is similar to that described for position A. Thus for position B, section 22 of the switch connects the six individual video channels from the band B antennas through switch contacts 28 and 31, individual channels 44, and master gain control 65 to the individual video amplifiers 62, 63, 64, 66, 67, and 68. Similar connections are provided for the switch positions C and D of switch 19. It is to be noted that the action of switch 19 is such that when positioned on one of the positions A through D, only the switch section corresponding to the particular position selected is affected and the remaining three switch sections maintain the connection discussed with respect to position "0," that is, paralleling the individual video channels from an antenna array and connecting them to a video amplifier to light the associated band indicating light.

The above-discussed directional presentation provides a simple means of obtaining a coarse indication of direction. Should it be desired to obtain more accurate bearing information, the system is capable of providing the basic information for a direction presentation, such as shown in Figure 2. As indicated in Figure 2, the outputs from the azimuth sector video amplifiers 62 through 69 are applied through appropriate connections to the plates of a cathode ray tube 94. The circuitry shown combines the six individual azimuth outputs to resolve them into "two-coordinate" voltages for bearing presentation as indicated by the deflection of an electron beam on the face of cathode ray tube 94. The presentation of a vector quantity on a cathode ray tube is made possible by appropriately placing deflection voltages proportional to the horizontal and vertical components of the vector upon the horizontal and vertical deflection plates. The circuitry of Figure 2 performs the appropriate voltage resolutions to combine the video signals received from the sixty-degree segments of the azimuth circle into "two-coordinate" voltages for application to the cathode ray tube. Subsequent deflection of the cathode ray beam is thus indicative of the direction of the received signal. The combining of the individual video amplifier outputs is indicated in Figure 2. Output 77 from the 0° amplifier 62 is connected directly to vertical plate 96 of cathode ray tube 94. The output 81 of the 180° video amplifier 66 is connected directly to vertical deflection plate 97. It is to be noted that these two outputs originate from diametrically opposed directional antennas and are applied to opposite plates of cathode ray tube 94. Thus the reception of a signal from the 0° azimuth sector, assuming the perfect case, results in a deflection voltage on plate 96 of the cathode ray tube with a corresponding zero voltage on the opposite plate 97. The electron beam is then deflected upward from the center of the cathode ray tube 94 to indicate that the signal is at 0° azimuth or dead ahead.

The outputs from the remaining azimuth video amplifiers are resolved into horizontal and vertical components in video resolvers 84 and 86 before application to the deflection plates of the cathode ray tube. The functioning of such video resolvers is well known in the art. Such devices consist of a rotor winding and two stator windings. The stator windings are displaced 90° relative to one another such that with a voltage $v$ impressed on the rotor winding, and the rotor oriented at an angle $\theta$ with respect to the stator windings, the voltages induced in the stator windings are proportional to $v \sin \theta$ and $v \cos \theta$, respectively.

The outputs 78 and 82 from the 60° and 240° video amplifiers 63 and 67 are applied to the opposite ends of rotor 88 of resolver 84. The opposite ends of stator 87 of resolver 84 are connected to the horizontal deflection plates 99 and 98 of cathode ray tube 94, which plates are indicative of 270° and 90° of azimuth, respectively. The opposite ends of the second stator 89 of resolver 84 are connected to vertical deflection plates 96 and 97 of cathode ray tube 94. The outputs from the 120° and 300° video amplifiers are connected to opposite ends of the rotor 93 of a second resolver 86. The opposite ends of a first stator 91 of resolver 86 are connected to horizontal deflection plates 99 and 98 of cathode ray tube 94. The opposite ends of the second stator 92 of resolver 86 are connected to vertical deflection plates 96 and 97 of cathode ray tube 94. As indicated in Figure 2, the rotor 88 of resolver 84 is locked in a position such that it forms an angle of 60° with respect to stator 89 and 30° with respect to stator 87. The rotor 93 of resolver 86 is locked such that it forms an angle of 120° with respect to stator 92 and an angle of 30° with respect to stator 91. It is to be noted that the rotor 93 of resolver 86 is positioned such that the voltage induced from rotor 93 to stator 92 is of opposite polarity to that which would be induced by a similar signal into stator 89 of resolver 82 from its rotor 88. The two locked rotor resolvers, with the connections shown, result in a development of coordinate voltages which are sine and cosine functions of the displacement angle between rotor and stator. This resolution of voltages into horizontal and vertical components may be illustrated by assuming reception of signals oriented at, for example, 60° and 240° from the receiving source. First, consider a signal emanating from a 60° azimuth source. It is apparent here that the deflection voltage on vertical deflection plate 96 of cathode ray tube 94 must be proportional to the signal amplitude multiplied by the cosine of 60° and of a positive polarity to cause deflection of the beam upwardly from the center of cathode ray tube 94. This deflection voltage we shall call $+v \cos 60°$. The horizontal deflection voltage must, by the same analysis, be equivalent to $+v \sin 60°$ where the plus sign is indicative of deflection to the right from the center of cathode ray tube 94. If now we consider a signal output from the 60° video amplifier 63, a signal current flows from connector 78 through rotor 88 of resolver 84 through connector 82 back to the diametrically opposite 240° amplifier 67. The presence of such a voltage on the rotor will, due to the angular relationship between rotor 88 and the two stators of resolver 84, result in a voltage across vertical deflection plates 96 and 97 of cathode ray tube 94 equal to $+v \cos 60°$. Simultaneously, a voltage induced in rotor 87 proportional to $+v \sin 60°$ is applied to horizontal deflection plates 99 and 98. Thus the electron beam is simultaneously imparted with deflection voltages of the proper horizontal and vertical magnitudes to position the beam for a 60° azimuth presentation. Now, conversely, should the received signal be from the 240° video amplifier, the current flow through rotor 88 of resolver 84 is in the opposite direction to that of signals received from the 60° video amplifier, and the voltages induced in the two stators are reversed in sign but maintain the same relative amplitude. The voltages applied to the horizontal and vertical deflection of cathode ray tube 94 are then in opposition to those previously experienced and the deflection of the beam is downward and to the left to indicate a 240° azimuth presentation.

In a similar manner, presentations for the 120° and 300° azimuth antennas are imparted by resolver action with the proper algebraic signs and amplitude functions to properly deflect the cathode ray beam for azimuth indication. It is to be noted here that a similar action is experienced, modified only by the fact that rotor 93 of resolver 86 is so positioned that it induces a voltage of opposite sign in stator 92 from that experienced in the corresponding stator 89 of resolver 84. Thus a signal from the 120° video amplifier develops a horizontal deflection component equal to $+v \sin 60°$ and a vertical deflection component equal to $-v \cos 60°$, while the deflection voltages for the 300° presentation are of opposite algebraic sign.

The above discussion has been presented in conjunction with signals received in ideal cases, that is, signals whose origins are multiples of 60° in azimuth. The reception of signals from intermediate points about the azimuth circle also results in the development of proper deflection voltages. In such cases the deflection voltage components are more complex and result from the composite voltages from two or more video amplifiers.

The development of the "two-coordinate" voltage for bearing presentation discussed above is based on the hypothesis that the outputs of the crystal diodes associated with each antenna are linear. However, since the output of such crystals is a function of the power received, the output is of a square-law function and means for additional compensation may be required. With reference to Figure 3, the output of each crystal diode is shown to be individually connected to the video preamplifiers 14 associated with the band A antennas 10. As indicated in the figure, video preamplifiers 14 include individual leveling controls 116 through 122 through which each individual video output is passed into the individual video preamplifiers 123 through 129. The leveling controls 116 through 122 function as automatic volume controls of a specialized nature such as nonlinear devices which might incorporate, for example, Thyrite. The leveling controls function to keep the output from the crystal diodes a linear voltage function with respect to input power to insure that video detected from signals received on the extreme edges of the six antenna receiving patterns does not fall to such a low-voltage level as to be unusable. The outputs from the six video preamplifiers 123 through 129 are individually applied to contacts 25 of section 21 of switch 19 as indicated in Figure 1.

It is thus seen that this invention provides means for simultaneously monitoring a frequency spectrum where said spectrum requires a plurality of antennas for signal reception. Any relatively strong signal in the frequency range will be intercepted and a band indication presented. In addition, means are provided for indicating the direction from which the signal is being transmitted relative to the receiving installation.

Although the invention has been described with respect to particular embodiments thereof, it is not to be so limited as changes and modifications may be made therein which are within the full intended scope of the invention as defined by the appended claims.

What we claim is:

1. A system for signal reception comprising a plurality of fixed antenna means, each said antenna means adapted for reception of a given band of frequencies and consisting of individual directional antennas oriented for reception from equal segments of a complete azimuth circle, a plurality of crystal detecting means, the outputs from said directional antennas individually connected to certain ones of said detecting means, a plurality of video preamplifiers, each said preamplifier receiving the output from one of said detecting means and delivering an output to multi-position switching means, a plurality of first video amplifiers, a plurality of second video amplifiers, said switching means being adapted such that in a first position the outputs of certain ones of said plurality of video preamplifiers are simultaneously connected to the inputs of certain ones of said first video amplifiers, and in successive switch positions, the outputs of certain ones of said plurality of video preamplifiers are individually connected to the inputs of certain ones of said second video amplifiers, first indicating means responsive to signal output from said first video amplifiers and second indicating means responsive to signal output from said second video amplifiers.

2. A system for reception of signals over a wide frequency spectrum comprising, a plurality of fixed antenna arrays, each said array adapted for reception of a frequency band within said spectrum and consisting of a plurality of antennas individually oriented for signal reception from a segment of the complete azimuth circle, the outputs from each individual antenna of each array connected through a crystal detector to a switching means, a plurality of first video amplifiers, a plurality of second video amplifiers, said switching means connecting the outputs from each of said antenna arrays in parallel to the input of certain ones of said first video amplifiers or connecting the outputs from certain ones of said antenna arrays individually to certain ones of said second video amplifiers, a first plurality of indicating means each connected to individual ones of first video amplifiers and a second plurality of indicating means each connected to individual ones of said second video amplifiers whereby said first plurality of indicating means indicates the frequency band in which the received signal lies and the second plurality of indicating means indicates the segment of the azimuth circle from which the signal is being received.

3. A system for signal reception comprising a plurality of fixed antenna means, each said antenna means adapted for reception of a given band of frequencies and consisting of individual directional antennas oriented for reception from equal segments of a complete azimuth circle, a plurality of crystal detecting means, the outputs from said directional antennas individually connected to certain ones of said detecting means, a plurality of video preamplifiers, each said preamplifier receiving the output from one of said detecting means and delivering an output to multi-position switching means, a plurality of first video amplifiers, a plurality of second video amplifiers, said switching means being adapted such that in a first position the outputs of certain ones of said plurality of video preamplifiers are simultaneously connected to the inputs of certain ones of said first video amplifiers, and in successive switch positions, the outputs of certain ones of said plurality of video preamplifiers are individually connected to the inputs of certain ones of said second video amplifiers, and a plurality of indicating lamps individually connected to the output of each of said first and second video amplifiers.

4. A receiving system for signals transmitted over a wide frequency spectrum comprising, a plurality of fixed antenna arrays each adapted for reception of a frequency band within said spectrum and consisting of six antennas individually oriented for signal reception from one sixth of the complete azimuth circle, the outputs from each individual antenna of each array individually connected to crystal detecting means, a plurality of first video amplifiers, six azimuth video amplifiers, switching means whereby the six video outputs from each antenna array may be simultaneously connected to the input of one of said first plurality of video amplifiers or individually connected to said azimuth video amplifiers, a first plurality of indicating means each connected to individual ones of said first video amplifiers and a second plurality of indicating means each connected to individual ones of said azimuth video amplifiers whereby said first plurality of indicating means indicates the frequency band in which the received signal lies and the second plurality of indicating means indicates the segment of the azimuth circle from which the signal is being received.

5. A receiving system for signals over a wide frequency spectrum comprising, a plurality of fixed antenna arrays each adapted for reception of a frequency band within said spectrum and consisting of six antennas with receiving axes individually oriented for signal reception from equal segments of the complete azimuth circle including zero azimuth, the outputs from each individual antenna of each array individually connected to crystal detecting means, a plurality of band video amplifiers, a plurality of azimuth video amplifiers, including a first, second, third, fourth, fifth, and sixth azimuth video amplifier, switching means whereby the video outputs from each antenna array may be simultaneously connected to the input of one of said band video amplifiers or individually connected to corresponding ones of said plurality of azimuth video amplifiers, a plurality of indicating lamps connected individually to the outputs of said band video amplifiers, a cathode ray tube having horizontal and vertical deflection plates, the outputs of said first and fourth azimuth video amplifiers individually connected to said vertical deflection plates, a first resolver, the outputs from said second and fifth azimuth video amplifiers connected to opposite ends of the rotor of said first resolver, the opposite ends of a first stator of said first resolver individually connected to said horizontal deflection plates and the opposite ends of a second stator of said first resolver individually connected to said vertical deflection plates, a second resolver, the outputs from said third and sixth azimuth video amplifiers connected to opposite ends of the rotor of said second resolver, the opposite ends of a first stator of said second resolver individually connected to said horizontal deflection plates and the opposite ends of a second stator of said second resolver individually connected to said vertical deflection plates, the rotor of said first resolver being fixed at an angular displacement of sixty degrees with respect to the second stator of said first resolver and the rotor of said second resolver being fixed at an angular displacement of one hundred twenty degrees with respect to the second stator of said second resolver whereby the six outputs from said azimuth video amplifiers are resolved into a two-coordinate voltage system to deflect the electron beam of said cathode ray tube to a position indicative of the azimuth of a received signal.

6. A system for signal reception comprising a plurality of fixed antenna means, each said antenna means adapted for reception of a given band of frequencies and consisting of a plurality of individual directional antennas oriented for reception from equal adjoining segments of a complete azimuth circle, a plurality of crystal detecting means, the outputs from said directional antennas individually connected to certain ones of said detecting means, a plurality of voltage leveling means, each said leveling means individually connected to one of said detecting means to correct nonlinearity thereof, a plurality of video preamplifiers, each said preamplifier receiving the output from one of said leveling means and delivering an output to multi-position switching means, a plurality of first video amplifiers, a plurality of second video amplifiers, master gain controlling means, said switching means being adapted such that in a first position the outputs of certain ones of said plurality of video preamplifiers are simultaneously connected to the inputs of certain ones of said first video amplifiers, and in successive switch positions, the outputs of certain ones of said plurality of video preamplifiers are individually connected through said master gain controlling means to the inputs of certain ones of said second video amplifiers, a first plurality of indicating means individually responsive to the output from a certain one of said first video amplifiers and a second plurality of indicating means individually responsive to the outputs from certain ones of said second video amplifiers.

7. A system for signal reception over a wide frequency spectrum comprising, a plurality of fixed antenna arrays each adapted for reception of a given frequency band within said spectrum and consisting of six antennas with receiving axes oriented for signal reception from equal segments of the complete azimuth circle including a segment centered about zero azimuth, the outputs from each individual antenna of each array connected to crystal detecting means, a plurality of band video amplifiers, a plurality of azimuth video amplifiers, switching means whereby the outputs from each antenna array may be simultaneously connected to the input of one of said band video amplifiers or individually connected to corresponding ones of said plurality of azimuth video amplifiers, a plurality of indicating lamps connected individually to the outputs of said band video amplifiers and responsive to output therefrom, a cathode ray tube, and means for resolving the outputs from said plurality of azimuth video amplifiers into a two-coordinate voltage for application to said cathode ray tube whereby the electron beam of said tube is deflected in a direction indicative of the azimuth of received signals relative to said antenna arrays.

No references cited.